United States Patent Office 3,178,444
Patented Apr. 13, 1965

3,178,444
CERTAIN (5-NITRO-2-THIAZOLYL)-UREA
COMPOUNDS
Paul Schmidt, Therwil, and Max Wilhelm and Kurt Eichenberger, Basel, Switzerland, assignors to Ciba Corporation, New York, N.Y., a corporation of Delaware
No Drawing. Filed Oct. 10, 1962, Ser. No. 229,751
Claims priority, application Switzerland, Oct. 25, 1961, 12,334/61
4 Claims. (Cl. 260—306.8)

One object of the present invention is to provide the new N-(2-chlorethyl)-N'-(5-nitro-thiazolyl-2)-urea and its salts, and a process for preparing it. Other objects will become evident from the following description.

Salts of the new compound are, for example, metal salts, more especially salts of alkali or alkaline earth metals, such as the salts of sodium, potassium or calcium, or ammonium salt or salts of organic amines.

The new urea and its salts act against parasites, more especially protozoae such as entamoebae, flagellates, such as trichomonads, and *Eimeria tenellum,* and schistosomes. They can be thus used pharmacologically on animals, but the new compounds are particularly suitable for the treatment of diseases caused by the aforementioned parasites, for example schistosomiasis, amoebic dysentry or amoebic hepatitis, or for example for the treatment of infections in animals caused by *Histomonas meleagridis* or *Eimeria tenellum,* for example for treating blackhead or coccodiosis in poultry and rabbits. The afore-mentioned compounds can also be used as intermediates for the manufacture of other valuable substances.

The new urea may be prepared by methods as such known. Preferably the compound of the formula

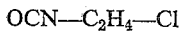

is reacted with the compound of the formula

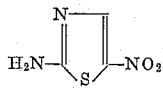

Another object of the invention is the new N-(2-hydroxy-ethyl)-N'-(5-nitro-thiazolyl-2)-urea which is obtained by hydrolysis of the [N-(2-chloro-ethyl)-N'-(5-nitro-thiazolyl-2)-urea. The N-(2-hydroxy-ethyl)-N'-(5-nitro-thiazolyl-2)-urea has the same kind of activity as the [N-(2-chloro-ethyl)-N'-(5-nitro-thiazolyl-2)-urea] and can be used for the same purposes.

The above reactions are carried out in conventional manner.

The starting materials are known or, if new, they can be prepared by known methods.

Depending on the reaction conditions used the new compounds are obtained in the free form or in the form of a salt thereof. The salts can be converted into the free compounds in known manner, for example by acidifying a solution of the salt. The free compounds in turn can be converted into the corresponding salts by known methods, for example by reaction with a basic agent, for example with a metal hydroxide or a basic salt, more especially an alkali metal hydroxide or alkaline earth metal hydroxide, such as sodium hydroxide, potassium hydroxide or calcium hydroxide, an alkali metal carbonate such as sodium carbonate or potassium carbonate, ammonia or an organic amine.

The new ureas and their salts can be used as medicaments, for example in the form of pharmaceutical preparations containing said compounds in admixture or conjunction with a solid or liquid organic or inorganic pharmaceutical excipient suitable for enteral (for example oral) or parenteral administration. Suitable excipients are substances that do not react with the new compounds such, for example, as water, gelatine, lactose, starch, magnesium stearate, talc, vegetable oils, benzyl alcohols, gums, polyalkylene glycols, cholesterol or other known medicinal excipients. The pharmaceutical preparations may be, for example, tablets, dragees or capsules, or in liquid form solutions, suspensions or emulsions.

The above-mentioned compounds may also be used in admixture with conventional fodders or vehicles in veterinary medicine in the form of preparations or as fodder or additives to fodder in animal husbandry. Preferably it is to be used as an additive to animal feedstuffs, especially for rearing and keeping poultry or rabbits. The invention therefore also concerns the animal feedstuffs or additives to animal feedstuffs which contain the new compounds in admixture with the customary extenders or diluents.

The composition of the feedstuffs or feedstuff additives, to which the above described compounds are added, depends on the kind of animal to be fed, its age, the current market price of the feedstuff concerned and other factors. As a rule, feedstuffs which contain carbohydrates, proteins, fats, minerals and vitamins are very advantageous. Suitable feed components are, for example, corn, such as rye, wheat, barely, oats, buckwheat, maize, sorghum or millet, and their ground products, such as groats, middlings, shorts or meal, grass clover, alfalfa, cabbage or hay, molasses, meat scrap, fish meal, soybean meal, groundnut meal or oil cake meal, cod liver oil, lime powder or bone meal, thiamine, riboflavin, ascorbic acid or vitamin $B_{12}$ or similar feed, mineral or vitamin supplements. The new compounds may also be given in solution or dispersion with drinking water or skimmed milk, if desired in the presence of a suitable dispersant or in the form of tablets or capsules.

The feedstuffs or feedstuff additives may also contain other valuable ingredients, for example antibiotics with a wide therapeutic range, such as tetracycline or chlorotetracycline, hormones or other compounds with a hormone activity, such as diethylstilbestol or hexestrol, or other growth-promoting factors, for example alkaloids obtainable from plants of the Apocynaceae family and having a sedative effect, such as reserpine, rescinnamine, deserpidine or raunescine or mother liquors or oleo-resins containing these.

The new feedstuffs, particularly the chicken food, contain, for example, 0.001 to 0.05%, preferably 0.005 to 0.01%, of the active ingredient. The chicken feedstuffs may be, for example, in the form of so-called all-feed for chicks or as all-mash for chickens, or in the form of a feed consisting of about two-thirds of grain-mixture and one-third of all-feed for chicks.

Accordingly, the invention also includes a process in which the new compounds are added to the customary animal feedstuffs and a process for rearing and keeping animals, particularly poultry and rabbits, consisting in giving feed or drink containing the above compounds.

EXAMPLE 1

A solution of 25 grams of 2-amino-5-nitro-thiazole and 50 grams of 2-chlorethyl isocyanate in 250 cc. of tetrahydrofuran is heated in a closed vessel for 16 hours at 80–90° C. and then allowed to cool. 150 cc. of tetrahydrofuran are then evaporated, the precipitate is suctioned off and thoroughly washed with warm isopropyl ether, to yield N-(2-chlorethyl)-N'-(5-nitro-thiazolyl-2)-urea of the formula

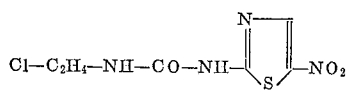

in yellow crystals melting at 140° C. with decomposition.

35 grams of N-(2-chlorethyl)-N'-(5-nitro-thiazolyl-2)-urea are boiled in 700 cc. of water with stirring for 7 hours. The precipitate which has settled is filtered off and the filtrate evaporated to 350 cc. in vacuo. After being allowed to stand for some time, N-(2-hydroxyethyl)-N'-(5-nitro-thiazolyl-2)-urea of the formula

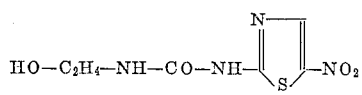

crystallizes out in the form of yellow crystals melting at 187–189° C.

EXAMPLE 2

Tablets are prepared with the following ingredients:

|  | Mg. |
|---|---|
| N-(2-chlorethyl)-N'-(5-nitro-thiazolyl-2)-urea | 100 |
| Lactose | 95 |
| Wheat starch | 54 |
| Gelatine | 6 |
| Arrowroot | 24 |
| Stearic acid | 6 |
| Talc | 15 |
|  | 300 |

The N-(2-chlorethyl)-N'-(5-nitro-thiazolyl-2)-urea is mixed with the lactose and the wheat starch. The gelatine is then processed with ten times its volume of water and the resulting mass kneaded with the aforementioned mixture. The whole is passed through a sieve (3 mm. mesh), granulated, dried at 45° C. and then passed again through a sieve of 1.5 mm. mesh. The mass is then granulated again and the arrowroot, the stearic acid and the talc added. The resulting mass is compressed into tablets having a diameter of 9 mm.

EXAMPLE 3

*Feedstuff composition*

| Premix: | G. |
|---|---|
| N-(2-chlorethyl) - N'-(5 - nitrothiazolyl - 2)-urea | 1.0 |
| Wheat standard middlings | 7999.0 |
| Total | 8000.0 |

| Mixture to be added: | G. |
|---|---|
| Maize flour | 1082.9 |
| Fat | 80.0 |
| Fish meal (60% protein) | 100.0 |
| Soybean meal (50% protein) | 500.0 |
| Maize gluten | 100.0 |
| Dehydrated alfalfa meal | 50.0 |
| Corn distillers' solubles | 40.0 |
| Calcium carbonate | 28.0 |
| Iodized salt | 10.0 |
| Vitamin A and of the D group (1,000,000 units of A and 250,000 units of D per pound) | 4.0 |
| Calcium pantothenate | 0.25 |
| Butylated-hydroxytoluene | 0.25 |
| Choline chloride of 25% strength | 2.5 |
| Riboflavin (24 grams per pound) | .1 |
| Vitamin $B_{12}$ (0.02 gram per pound) | 1.0 |
| Methionine | 0.5 |
| Manganese sulfate | 0.5 |
| Total | 2000.0 |

The mixture to be added is prepared as follows: About half of the maize flour is put into the mixer, the remainder to which the heated, liquefied fat has been added, is then added and the whole is mixed until the fat is evenly distributed. While mixing, the manganese sulfate, calcium carbonate and iodized salt are then added, followed by the fish meal, soybean meal, alfalfa and maize gluten and the corn distillers' solubles. After mixing thoroughly, the vitamns A and D, the calcium pantothenate, choline chloride, riboflavin, vitamin $B_{12}$, methionine and butyl-hydroxy-toluene are added. The thoroughly mixed premix is then added and mixing is continued until all the ingredients are evenly distributed.

*Example 4*

| Feedstuff additive: | G. |
|---|---|
| N-(2-chlorethyl)-N'-(5-nitrothiazolyl-)-urea | 100 |
| Carbo medicinalis | 15 |
| Cerelose to make | 1000 |

The well mixed feedstuff additive is added to the feed in an amount to give a concentration of about 0.01% of active substance in the uniformly blended mix.

What is claimed is:
1. N-(2-chlorethyl)-N'-(5-nitro-thiazolyl-2)-urea.
2. A member selected from the group consisting of an alkali metal, alkaline earth metal, and ammonium salts of the compound claimed in claim 1.
3. N-(2-hydroxy-ethyl)-N'-(5-nitro-thiazolyl-2)-urea.
4. A member selected from the group consisting of an alkali metal, alkaline earth metal, and ammonium salts of the compound claimed in claim 3.

References Cited by the Examiner

UNITED STATES PATENTS

| 2,543,748 | 3/51 | Waletzsky | 167—53.1 |
| 2,755,285 | 7/56 | O'Neill et al. | 260—306.8 |
| 3,052,602 | 9/62 | Hymas et al. | 167—53.1 |

FOREIGN PATENTS

| 877,106 | 9/61 | Great Britain. |

OTHER REFERENCES

Burger: Medicinal Chemistry (New York, 1960), pages 43 and 75–77.

IRVING MARCUS, *Primary Examiner.*

NICHOLAS S. RIZZO, WALTER A. MODANCE, *Examiners.*